United States Patent
Scott et al.

(10) Patent No.: US 11,804,728 B2
(45) Date of Patent: *Oct. 31, 2023

(54) METHODS AND SYSTEMS FOR POWER MANAGEMENT CONTROL

(71) Applicant: ASCO Power Technologies, L.P., Florham Park, NJ (US)

(72) Inventors: Matthew Scott, Vestal, NY (US); Mario Ibrahim, Summit, NJ (US); Victor E. Bonachea, Elmwood Park, NJ (US); Adrian Ramkelawan, Bloomfield, NJ (US); Donald K. Blackman, Denville, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/519,053

(22) Filed: Nov. 4, 2021

(65) Prior Publication Data
US 2022/0060047 A1    Feb. 24, 2022

Related U.S. Application Data

(60) Continuation of application No. 16/025,887, filed on Jul. 2, 2018, now Pat. No. 11,201,495, which is a division of application No. 14/334,490, filed on Jul. 17, 2014, now Pat. No. 10,014,712.

(51) Int. Cl.
H02J 9/06       (2006.01)
H02J 13/00      (2006.01)

(52) U.S. Cl.
CPC .......... *H02J 9/06* (2013.01); *H02J 13/00016* (2020.01); *H02J 13/00034* (2020.01); *Y02B 70/30* (2013.01); *Y02B 90/20* (2013.01); *Y04S 20/12* (2013.01); *Y04S 20/248* (2013.01)

(58) Field of Classification Search
CPC .. H02J 9/06; H02J 13/00016; H02J 13/00034; Y02B 70/30; Y02B 90/20; Y04S 20/12; Y04S 20/248; Y04S 10/52
See application file for complete search history.

(56) References Cited

U.S. PATENT DOCUMENTS

| | | | |
|---|---|---|---|
| 6,985,343 B2 * | 1/2006 | Mirowski | G06F 1/28 361/93.2 |
| 9,735,613 B2 | 8/2017 | Orthlieb et al. | |
| 10,840,735 B1 * | 11/2020 | Cooper | H02J 3/32 |
| 10,879,727 B1 * | 12/2020 | Cooper | H02J 9/062 |
| 10,892,618 B1 | 1/2021 | Cooper | |

(Continued)

*Primary Examiner* — Ziaul Karim
(74) *Attorney, Agent, or Firm* — Locke Lord LLP

(57) ABSTRACT

Methods and systems for control of a power-quality measuring or monitoring device, such as a transfer switch, are provided. An example method includes a transfer-switch controller of a transfer switch receiving an input command from a user. The method further includes, in response to receiving the input command, the transfer-switch controller entering a safe state, wherein in the safe state operational settings of the transfer switch remain unchanged. Still further, the method includes, after entering the safe state, the transfer-switch controller providing, based on operational data specific to the transfer switch, information regarding a feature of the transfer switch.

23 Claims, 4 Drawing Sheets

(56) References Cited

U.S. PATENT DOCUMENTS

| | | | |
|---|---|---|---|
| 2003/0197993 A1* | 10/2003 | Mirowski | G06F 1/28 |
| | | | 361/93.2 |
| 2007/0055889 A1 | 3/2007 | Henneberry et al. | |
| 2008/0046205 A1* | 2/2008 | Gilbert | G01D 4/004 |
| | | | 702/62 |
| 2008/0182630 A1* | 7/2008 | Parks | G06F 1/3293 |
| | | | 455/574 |
| 2008/0291607 A1 | 11/2008 | Braunstein et al. | |
| 2008/0313006 A1 | 12/2008 | Witter et al. | |
| 2009/0179498 A1* | 7/2009 | Lathrop | H01H 47/32 |
| | | | 307/68 |
| 2011/0106328 A1* | 5/2011 | Zhou | G05B 13/024 |
| | | | 700/291 |
| 2012/0271460 A1 | 10/2012 | Rognli | |
| 2012/0310416 A1 | 12/2012 | Tepper et al. | |
| 2015/0008827 A1 | 1/2015 | Carrigan et al. | |
| 2015/0270743 A1 | 9/2015 | Orthlieb et al. | |

* cited by examiner

METHODS AND SYSTEMS FOR POWER MANAGEMENT CONTROL

CROSS REFERENCE TO RELATED APPLICATIONS

This application is a continuation of U.S. patent application Ser. No. 16/025,887, filed on Jul. 2, 2018, which is a divisional of U.S. patent application Ser. No. 14/334,490, filed on Jul. 17, 2014, now U.S. Pat. No. 10,014,712, issued on Jul. 3, 2018. The entire contents of the foregoing applications are incorporated by reference herein in their entirety.

BACKGROUND

Unless otherwise indicated herein, the materials described in this section are not prior art to the claims in this application and are not admitted to be prior art by inclusion in this section.

The present disclosure relates generally to devices and systems for power management such as power monitoring, control, and measurement. Such as devices and systems that may be used to prevent power interruptions or improve power quality through the use of an operator-computer-controlled interface. For example, the present disclosure may find use in various types of power management devices such as power switchgear, Uninterruptable Power Supplies (UPSs), load banks, generators, Computer Room Air Conditioner (CRAC) units, Computer Room Air Handling (CRAH) units, parallel switchgear, substation switchgear, utility switchgear, and the like. More specifically, this application concerns methods and systems for control of a power-quality measuring or monitoring device, such as a transfer switch.

Power-quality measuring and monitoring is an important concept in the power industry and generally relates to devices, methods, and systems that ensure that an alternating current (AC) power system is consistent, free from harmonic content, and/or remains uninterrupted. For example, a power-quality meter is one type of device that can give some form of harmonic content indication. Another example of a power-quality and monitoring device is a power transfer switch that is used to switch electrical loads between two independent sources of power, so as to prevent disruption in service. A principal goal of a power transfer-switch system is to ensure that the electrical load is supplied with an acceptable source of power at a high rate of availability and to minimize load disruptions. Power transfer switches are in widespread use in, e.g., airports, subways, schools, hospitals, military installations, industrial sites, and commercial buildings equipped with secondary power sources and where even brief power interruptions can be costly or perhaps even life threatening.

Power transfer switches typically contain numerous features, such as various functions, controls, settings, and capabilities. Power transfer switches also are extremely high power electrical equipment and thus garner a great deal of respect from operators of transfer switches.

For example, due to the high complexity and potential for unintended operation (such as switching to a generator that is connected but under maintenance or undersized for newly installed load), transfer-switch users are typically extremely cautious about exploring the controls and settings of a transfer switch. Therefore, a process of learning and/or exploring the controls and settings of the transfer switch typically falls on the transfer-switch manual to detail the complete operation of the transfer switch controls. However, this places a burden on transfer-switch users or operators to either read through the entire manual or simply learn a small subset of operations. Only learning a small subset of available operations may, for example, leave the transfer switch underutilized. Underutilization of the transfer switch may even result in financial burden, for example, if the user chooses to install additional equipment that duplicates functionality the user was unaware could be achieved with their current transfer switch.

SUMMARY

Methods and systems for control of a power management device (e.g., a power-quality measuring or monitoring device), particularly such as a transfer switch, are provided. In an example embodiment, a method includes a power management controller of a power management device receiving an input command from a user. The method further includes, in response to receiving the input command, the power management controller entering a safe state, wherein in the safe state operational settings of the power management device remain unchanged. Still further, the method includes, after entering the safe state, the power management controller providing, based on operational data specific to the power management device, information regarding a feature of the transfer switch. In one arrangement, the power management device may comprise a transfer switch. However, alternative power management devices may also be used such as power switchgear, Uninterruptable Power Supplies (UPSs), load banks, generators, Computer Room Air Conditioner (CRAC) units, Computer Room Air Handling (CRAH) units, parallel switchgear, substation switchgear, utility switchgear, and the like.

In another example embodiment, a method includes a transfer-switch controller of a transfer switch receiving an input command from a user. Further, the method includes, in response to receiving the input command, the transfer-switch controller entering a safe state, wherein in the safe state operational settings of the transfer switch remain unchanged. Yet still further, the method includes, after entering the safe state, the transfer-switch controller providing information regarding a feature of the transfer switch.

In yet another example embodiment, a controller for a power-quality measuring or monitoring device is provided. The controller for a power-quality measuring or monitoring device includes a communication interface and a memory configured to store program instructions. The controller further includes a processor capable of executing the program instructions to: (i) receive an input command from a user; (ii) in response to receiving the input command, enter a safe state, wherein in the safe state operational settings of the power-quality measuring or monitoring device remain unchanged; and (iii) after entering the safe state, provide, based on operational data specific to the power-quality measuring or monitoring device, information regarding a feature of the power-quality measuring or monitoring device.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
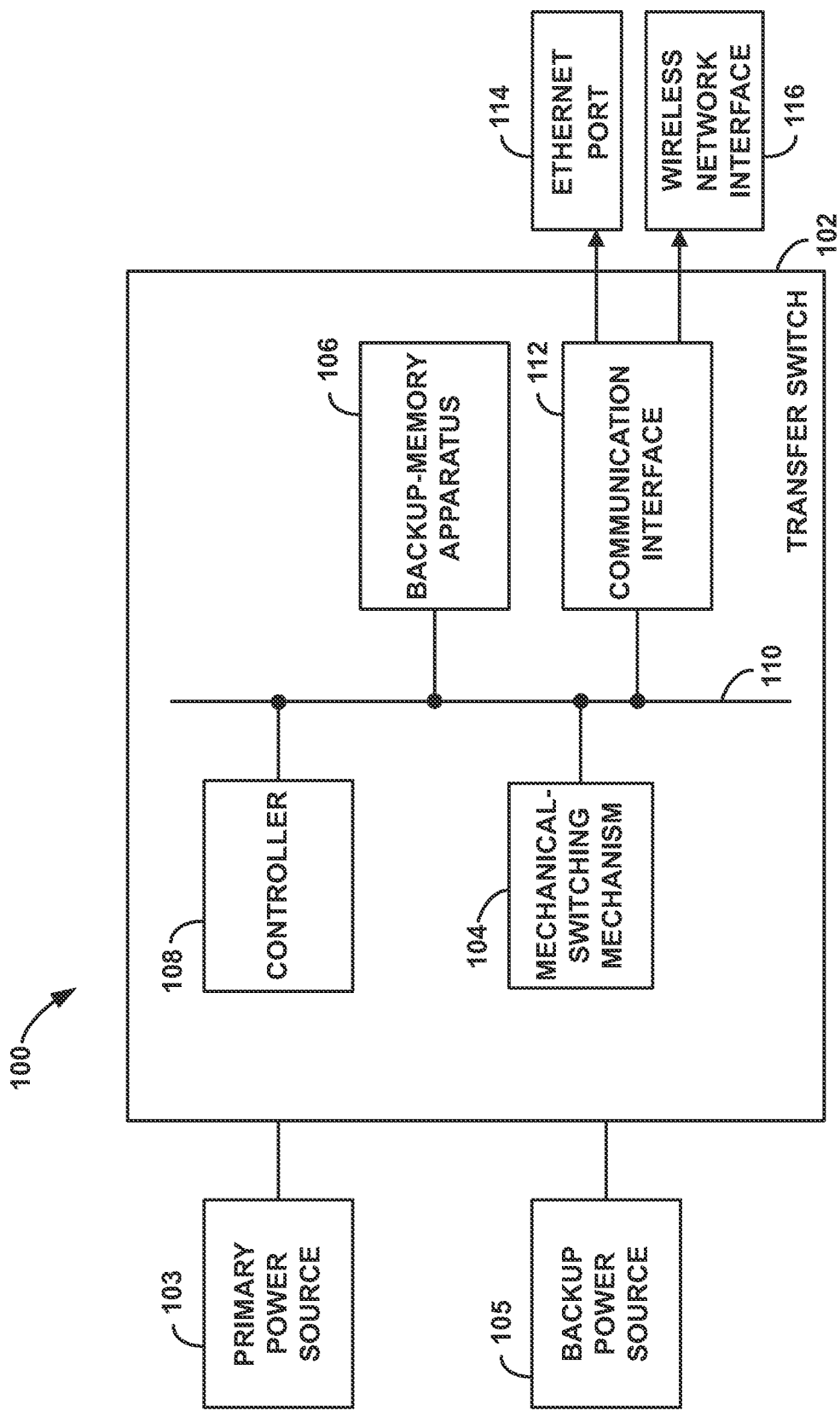
FIG. 1 is a simplified block diagram of an example power management system, according to an example embodiment of the present disclosure.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

As mentioned above, certain power management devices such as transfer switches typically contain numerous features, such as various functions, controls, settings, and capabilities. However, users are typically very cautious about exploring the features of a transfer switch. While a manual of the transfer switch may detail the complete operation of the transfer switch features, this may place a great burden on a user to read and understand the entire manual. Further, in many cases, a user may simply learn a small subset of transfer-switch operations, which may leave many operations of the transfer switch underutilized.

It would be desirable to provide a user of a power management device such as a transfer switch with a more focused and intuitive approach to learning and exploring the features of the power management device. An example method and system in accordance with the present disclosure may help to provide a more focused and intuitive approach to learning and exploring the features of the power management device. An example method in accordance with the present disclosure includes a power management controller of a power management device receiving an input command from a user. The method further includes, in response to receiving the input command, the power management controller entering a safe state, wherein in the safe state operational settings of the power management device remain unchanged. Still further, the method includes, after entering the safe state, the power management controller providing, based on operational data specific to the power management device, information regarding a feature of the device.

In an example, the transfer-switch controller may have a graphical touch-based interface which allows a user to input a command to enter the safe state. For instance, the transfer-switch controller may have a help button displayed on a touch screen. After a user presses this help button, the transfer-switch controller may enter a safe state and then prompt the user to select a feature about which they wish to learn. After the user makes a feature selection, the transfer-switch controller may, for example, present the user with a video or text that describes the feature and demonstrates the use of the feature. In an example embodiment, this presented information could be dynamic and based on actual operation data from the transfer switch when appropriate.

As mentioned above, in prior systems, typically a user would attempt to learn about the transfer switch from a manual. Further, a user may also have attempted to learn about the transfer switch from online videos. However, these prior ways of learning about the transfer switch suffer from disadvantages. For instance, these learning methods may lead to underutilization of various features or controls of the transfer switch. As another example, these learning methods may be time consuming and/or unavailable to the user when the user desires the information (e.g., when the user is in front of the transfer-switch controller and does not have access to a manual). As yet another example, these learning methods may not take into account the current state and operational settings of the transfer switch.

Beneficially, the disclosed methods and systems may allow the user to learn how to use a transfer-switch feature as soon as they encounter it during operation of the controller of the transfer switch. Furthermore, by incorporating operational data into the information provided by the controller, the disclosed methods and systems could better portray the interaction of settings and features in the transfer switch. Therefore, the disclosed methods and systems may provide a convenient situational help function or feature that is not only specific to the transfer-switch model of the transfer switch, but also specific to the current state and operational settings of the transfer switch.

Although an example embodiment of the disclosed methods and systems is described with respect to a transfer switch, it should be understood that the disclosed methods and systems may be applicable to any suitable power-quality measuring or monitoring device.

2. Example Transfer-Switch System

FIG. 1 is an illustration of an example power management system in which the proposed methods and systems can be implemented. In this illustrated arrangement, the power management system comprises a transfer switch system. However, it should be understood, however, that numerous variations from the arrangement and functions shown are possible while remaining within the scope and spirit of the claims. For instance, elements may be added, removed, combined, distributed, substituted, re-positioned, re-ordered, or otherwise changed.

Further, where this description refers to functions being carried out by an entity such as a transfer-switch controller, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure. Yet still further, although a transfer switch system is illustrated, alternative power management systems may also utilize the various features discussed and described in this disclosure.

The transfer-switch system 100 includes a transfer switch 102 that, for example, functions as a switch between a primary power source 103 and a backup, standby power source 105. The transfer switch 102 includes a mechanical-switching mechanism 104. The mechanical-switching mechanism 104 may be configured to operate automatically or manually or a combination of automatic and manual operation. The switch mode of the mechanical-switching mechanism 104 may be Open Transition (OT) or Closed Transition (CT).

The transfer switch 102 also includes a backup-memory apparatus 106 and a transfer-switch control unit such as transfer-switch controller 108. The mechanical-switching mechanism 104, the memory apparatus 106 and the transfer-switch controller 108 may be coupled together by a system bus or other mechanism 110. In an example alternative mechanism, a wireless data channel may be provided.

In addition, the transfer-switch system 100 may also comprise communication interface drivers 112. The one or more communication interface drivers 112 may facilitate communication between components of the system 100, communication between the system 100 and one or more devices of a system control center, and/or communication with one or more external parties. For instance, the system 100 may communicate using a Modbus driver or a controller area network (CAN) bus driver, or other communication interface driver. Other communication interface drivers may also provide for communication using Modbus Ethernet, CANOpen, wired or wireless Ethernet, DeviceNet, Profi-Bus, BACNet, ARCNet, ZigBee, Bluetooth, Wi-Fi, and other similar protocol structures.

In one example, the controller 108 may be configured to provide an indication of data that is received by the primary or secondary power sources 103, 105 to one or more subscribing parties based on subscription information for the subscribing parties that is stored in a database of the memory 106 and accessible by the controller 108. In one example, subscription information for a given subscribing party may include one or more of an identification of the subscribing party, a communication type (e.g., Ethernet, wireless via Wi-Fi cloud service, etc.), and a notification frequency (e.g., how often to provide data to the subscribing party).

In one instance, based on subscription information for a subscribing party, the controller may be configured to provide an indication of data that is received by the primary or secondary power sources 103, 105 to the subscribing party via an Ethernet port 114. For instance, the Ethernet port may facilitate local management system interfacing via BACNet or Profinet protocols.

In another instance, based on subscription information for a subscribing party, the controller may be configured to provide an indication of data that is received by the controller 108 to the subscribing party via a wireless network controller 116. For example, the wireless network interface controller 116 may be coupled to a server in a network via a wireless access point. In one instance, the wireless access point may include a wireless router that is coupled to a wired network (e.g., the Internet), or the wireless access point may be configured to connect to a wireless router. The wireless network interface controller 116 may utilize any type of wireless protocol such as Wi-Fi, Wireless Application Protocol (WAP), Bluetooth, etc. In another instance, the wireless network interface controller 116 may include a wireless modem which utilizes a cellular communication system to communicate with a wired network. For example, the wireless modem may be configured to communicate using GPRS, UMTS, HSPA, EVDO, WiMax, LTE, or other cellular communication protocols.

The transfer-switch system 100 or at least one component of the transfer-switch system 100 may be configured to carry out various functions of the disclosed methods. For example, transfer-switch controller 108 may be configured to carry out various functions of the disclosed methods. One of many possible embodiments will be described, however, this embodiment, which is specific to a transfer-switch controller, shall by no means be construed as limiting the many possible variations in design of each of the components of the disclosure.

Figure 2:
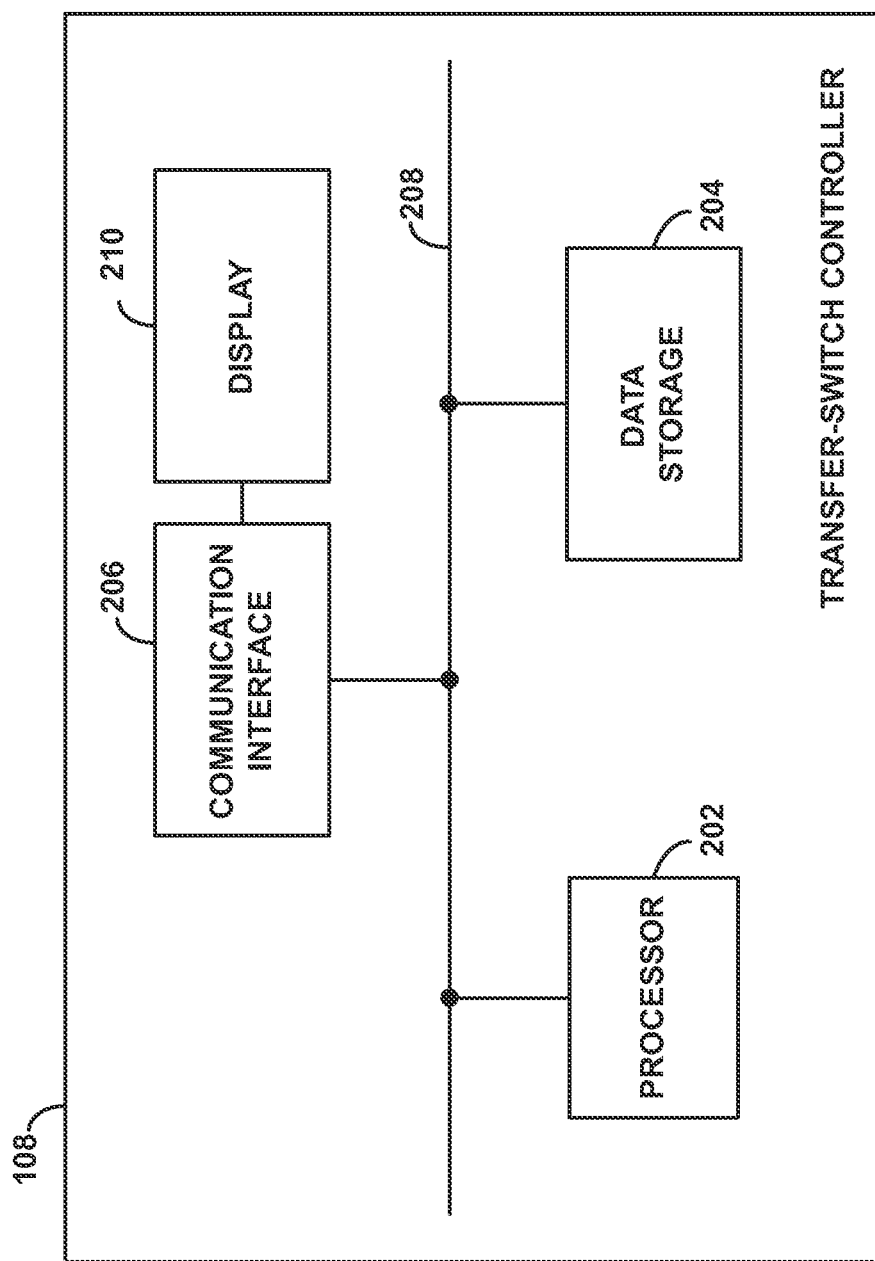
FIG. 2 is an illustration of an example power management controller, according to an example embodiment of the present disclosure.

FIG. 2 is a simplified block diagram of the transfer-switch controller 108 showing some of the components that such a controller may include to facilitate implementation of the present methods. As shown in FIG. 2, the transfer-switch controller 108 may include a processor 202, data storage 204, and communication interface 206, all of which may be coupled together by a system bus or other mechanism 208.

Each of these components of the transfer-switch controller 108 may take various forms. For instance, processor 202 could be one or more general-purpose microprocessors and/or dedicated signal processors. Data storage 204 could be volatile and/or nonvolatile memory, such as flash memory. The transfer-switch controller 108 may communicate with entities of the transfer-switch system 100, such as the mechanical-switching mechanism 104 and backup-memory apparatus 106. Data storage 204 holds a set of logic (e.g., computer instructions) executable by processor 202 to carry out the various functions described herein and perhaps other functions. Data storage 204 may also have stored therein information regarding the transfer switch, including but not limited to videos or text about various features (e.g., functions, controls, settings and/or capabilities) of the transfer switch. In some embodiments, one or more of the transfer-switch-controller functions can be carried out by firmware and/or hardware. Further, communication interface 208 may include or be connected to a display 210 (e.g., a touch-screen display and/or computer monitor). In an example, the transfer-switch controller 108 may display information regarding a feature of the transfer switch 102 via the display 210. An example display is a color touch screen having at least a 7 inch display (measured diagonally). The display may, for example, utilize a 5-wire resistive touch screen. However, other example displays and/or touch screens are possible as well.

In addition to the visual display, the communication interface 208 may also be configured to generate audio signals, so as to provide transfer-switch information via audio signals. Further, the transfer-switch controller 108 may include circuitry that allows the controller to generate an alarm signal either visually, audibly, through email, text message, etc. (or a combination of such methods) to notify a user that an issue or problem exists.

3. Example Methods for a Transfer-Switch System

Figure 3:
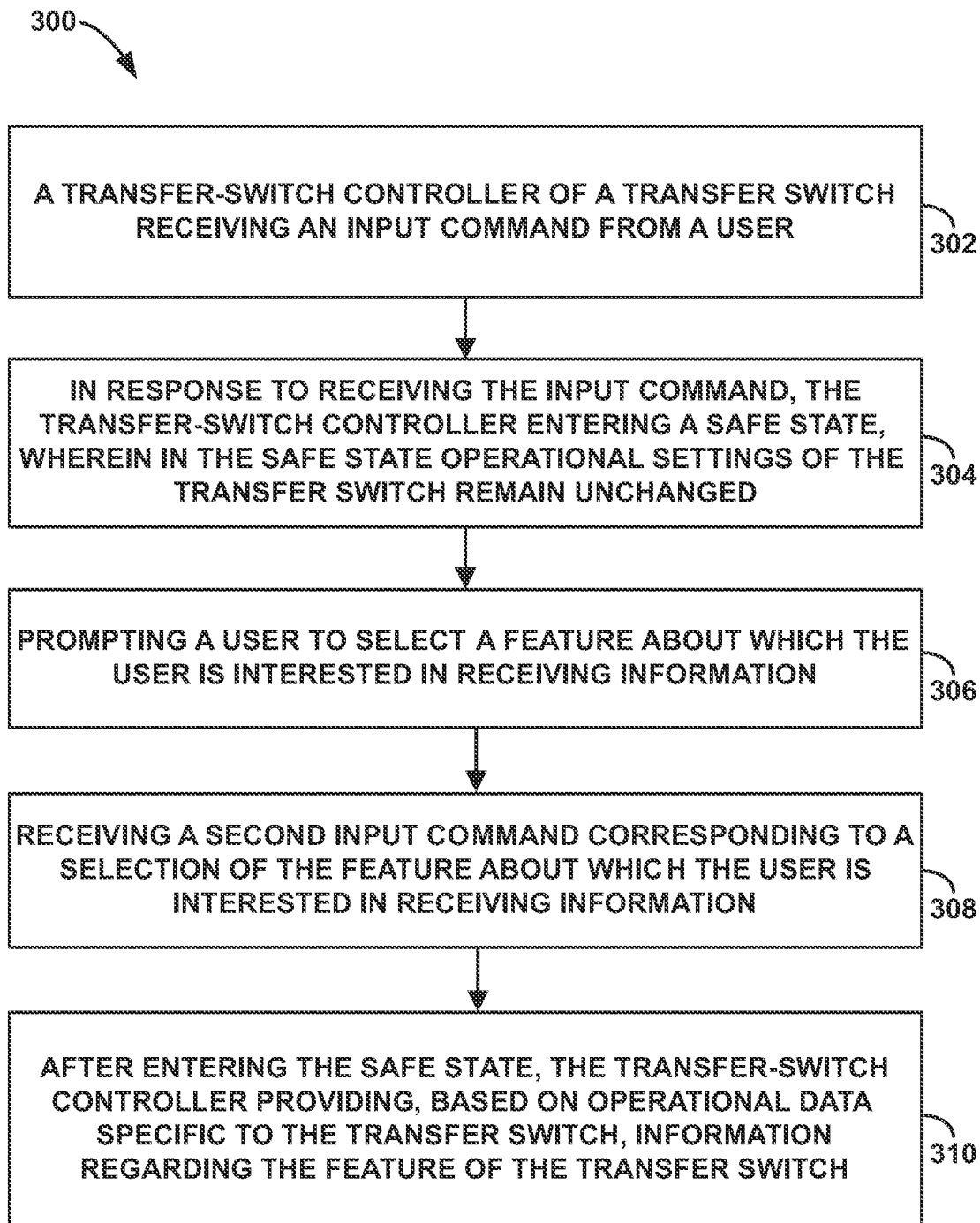
FIG. 3 is a flow chart illustrating an example method, according to an example embodiment of the present disclosure.

FIG. 3 is a flow chart depicting functions that can be carried out in the disclosed process in practice, in accordance with an example embodiment. The method 300 of FIG. 3 provides for a transfer switch with a focused and intuitive approach for allowing a user to both learn and explore the various features of the transfer switch. Method 300 shown in FIG. 3 presents an embodiment of a method that could be carried out by transfer-switch system 100 of FIG. 1, or one or more components of the transfer-switch system 100 such as transfer-switch controller 108, for example.

As shown in FIG. 3, at block 302, the method involves a transfer-switch controller of a transfer switch receiving an input command from a user. At block 304, the method then involves, in response to receiving the input command, the transfer-switch controller entering a safe state, wherein in the safe state operational settings of the transfer switch remain unchanged. At block 306, the method also involves prompting a user to select a feature about which the user is interested in receiving information. At block 308, the method also involves receiving a second input command corresponding to a selection of the feature about which the user is interested in receiving information. At block 310, the method then involves, after entering the safe state, the transfer-switch controller providing, based on operational data specific to the transfer switch, information regarding the feature of the transfer switch.

It should be understood that for this and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems, or other articles of manufacture. The computer readable medium may be considered a computer readable storage medium, for example, or a tangible storage device.

In addition, for the method 300 and other processes and methods disclosed herein, each block may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

a. Entering the Safe State

Returning to FIG. 3, at block 302, the transfer-switch controller 108 receives an input command from a user to enter the safe state. Further, at block 304, in response to receiving the input command, the transfer-switch controller 108 enters a safe state, wherein in the safe state operational settings of the transfer switch remain unchanged.

The transfer-switch controller 108 may receive the input command from the user to enter the safe state in a variety of ways. In an example embodiment, the transfer-switch controller 108 may be configured such that in the graphic display 210 of controller 108 includes an input feature that the user may select in order to enter the safe state. For instance, the display 210 may include a button (e.g., a button labeled "Help" or a button labeled "More information") that the user may select in order to enter the safe state.

The display 210 may be configured to have various display screens, depending on the feature about which the transfer-switch controller 108 is displaying information. In an example, the transfer-switch controller 108 may have a main menu that provides tabs for various features. For instance, the main menu may provide tabs for display screens that deal with, without limitation: metering (e.g., single and/or dual metering), manual paralleling, system setup, generator setup, system status, one-line, trending data (e.g., single trending and/or multi-trending), event log, security, voltage and frequency settings, time delay, bypass-isolation switch options, and surge protection. Other screen displays and/or features are possible as well. In an example, the transfer-switch controller 108 includes a safe-state button on each display screen of the transfer-switch controller. Therefore, a user may select safe mode from any display screen that is currently being displayed in display 210. In another example, the safe-state button may be available on select screens of certain features.

In another example embodiment, the communication interface 208 may be configured to receive audio commands from a user, and the input command to enter the safe state may be an audio command. For instance, a user may instruct the transfer-switch controller 108 to enter the safe state by stating a predetermined phrase that the controller 108 associates with entering the safe state. Example possible phrases include, without limitation, "enter safe mode", "enter safe state", "more information", etc. Other input commands for entering the safe state are possible as well.

After a user enters the input command to enter the safe state, the transfer-switch controller 108, at block 304 enters the safe state. As mentioned above, in the safe state operational settings of the transfer switch remain unchanged. That is, during the safe state, the transfer-switch settings are not and/or cannot be modified. Since the settings are not and/or cannot be modified, the transfer switch will continue to operate under the settings which the transfer switch was operating under before the transfer-switch controller entered the safe state. Therefore, in the safe state, the user is able to explore features (e.g., by pressing various buttons to receive information about various features) without having to worry about changing any operational settings of the transfer switch.

In an example embodiment, the transfer-switch controller 108 may provide an indication to the user that the transfer-switch controller has entered the safe state. For example, the transfer switch controller 108 may visually denote that the transfer-switch controller 108 is in a safe state, such as by adding a special border on the display 210. Additionally or alternatively, the transfer-switch controller 108 may provide an audio indication that the controller 108 is entering the safe state. Other examples of indicating that the transfer-switch controller 108 has entered the safe state are possible as well.

b. Selecting a Feature about which to Provide Information

Returning to FIG. 3, at block 306, the transfer-switch controller 108 prompts a user to select a feature about which the user is interested in receiving information. In an example, the user will be prompted (e.g., audibly and/or visually) to select a feature in which the user is interested. At block 308, the transfer-switch controller 108 receives an input command corresponding to a selection of the feature about which the user is interested in receiving information. In an example, the feature may be a particular function or control of the transfer switch 102. Additionally or alternatively, the feature may be a given setting of the transfer switch. Example features include, without limitation, metering features, manual-paralleling features, system-setup features, generator-setup features, system-status features, trending-data features, event-log features, time-delay features, bypass-isolation switch options, surge-protection features, voltage and frequency settings, and security features.

The input command to select a feature may be a touch-based input command or an audio command. Other examples are possible as well. In an example embodiment, the input command to enter the safe state may be the same command as the input command that identifies the feature about which the user is interested in receiving information.

For example, a user may be viewing a display screen of a particular feature, and the user may then select to enter the safe state by pressing a "More Information" button. In such a case, pressing this button may signify to the transfer-switch controller 108 that the user wishes to enter the safe state and wishes to receive information about the particular feature.

In another example, the input command to enter the safe state may be a command different than the input command that identifies the feature about which the user is interested in receiving information. For example, the user may enter a first input command (e.g., pressing a "Help" button) to enter the safe state. Then, in the safe state, the transfer-switch controller 108 may prompt the user to select a feature about which the user is interested in receiving information, and the user may enter a second input command that identifies the feature.

c. Providing Information about the Selected Feature

At block 310, the transfer-switch controller 108 provides, based on operational data specific to the transfer switch, information regarding the feature of the transfer switch. For instance, once the user has made their selection about which feature about which they wish to receive more information, the transfer-switch controller 108 will then provide the user with an explanation of the feature.

Various types of information regarding the feature of the transfer switch may be provided to the user. For example, the provided information may be information about specific functionality of the selected feature. The information may be information regarding an interaction of the feature with at least one other feature of the transfer switch. For example, the pickup voltage for the transfer switch must be greater than the dropout voltage by a certain degree. As such, the exact bounds of these settings may change depending on one another.

As another example, the information may be information regarding at least one direct effect of the feature on the transfer switch. For example, a transfer button may cause the transfer switch to switch to change sources, unless a transfer inhibit feature is activated.

As yet another example, the information may be information regarding at least one side effect of the feature on the transfer switch. For example, a test transfer inhibit feature may not allow test transfers to be performed.

As still yet another example, the information may be information regarding at least one situation in which the feature may be unavailable.

And as yet another example, the information may be information regarding at least one situation in which the feature may have different behavior based on other settings in the transfer switch. For example, pick-up and drop-out voltages are normally Line-to-Line unless the power source is single phase such as Line-to-Neutral.

Further, as mentioned above, the transfer-switch controller 108 provides this information based on operational data specific to the transfer switch 102. Therefore, the information provided is information that is based on operational data of the particular transfer switch. In an example embodiment, the operational data comprises current operational settings of the transfer switch. Therefore, the information provided to the user may not only be specific to the particular transfer switch, but also specific to the current operational settings of the transfer switch. For example, changes to a generator test schedule do not take effect during a scheduled generator test (i.e., instructing the switch to no longer test on a Wednesday will not cause the switch to abandon Wednesday's test right in the middle of such a test. As such, the information provided to the user may beneficially be more focused and perhaps more useful to the user than information a user would receive from a manual and/or an online video.

It should be understood that the information described above are intended as examples only and other information may be provided to the user as well.

d. Providing Information about Hypothetical Action

Further, the transfer-switch controller 108 may be configured to provide information about potential effects of a particular action the user might take with respect to the feature. For instance, providing information regarding a feature of the transfer switch may involve (i) receiving an input command corresponding to a hypothetical selected action related to the feature and then (ii) providing information regarding an effect of the hypothetical selected action on the transfer switch. Taking current settings into account, the controller 108 could analyze what effect a hypothetical action could have on the current state and operational settings of the transfer switch.

In an example embodiment, the hypothetical selected action is a hypothetical change of a setting of the feature. For instance, a user may select changing a given operational setting from a first setting to a second setting. The transfer-switch controller 108 may then explain possible effects of changing from the first setting to the second setting, such as how the second setting may affect that particular feature and/or how that second setting may affect other transfer-switch features (e.g., other current settings of the transfer switch). For example, disabling the in-phase transfer feature of the transfer switch would likely disable the setting controlling how close to in-phase the primary and secondary sources must be in order for a transfer to be completed.

By providing information based on current settings, the transfer-switch controller 108 may provide extremely focused information that may help the user to better understand the settings, functions, and capabilities of the transfer switch. Further, the transfer-switch controller 108 may provide information about what actions a user can take and cannot take based on the current settings.

The controller 108 may also be configured to provide information that informs a user how to make various changes to operational settings. In an embodiment, after receiving the information about a hypothetical change that the user inquired about, the user may wish to proceed with making the hypothetical change. The transfer-switch controller 108 may be configured so as to allow the user to easily make that change. For example, the provided information may provide a step-by-step guide that shows the user how to make the settings change, and the user may then use that information to make the change after exiting the safe state.

In another example, the transfer-switch controller 108 may be configured so as to allow the user to indicate that they wish for the controller to automatically make the change after the controller has exited the safe state. As mentioned above, operational settings remain unchanged during the safe state; however, in an example, the user may provide input while in safe mode that may influence a change in operational settings when the controller 108 exits the safe state. For example, the method 300 may further involve after providing information regarding an effect of the hypothetical change, prompting the user to select whether to make the hypothetical change. The transfer-switch controller 108 may then receive an input command corresponding to whether the user selected to make the hypothetical change. In if the user selected to make the hypothetical change, the transfer-switch controller 108 may leave the safe state and change the settings of the feature based on the hypothetical change. On the other hand, if the user selected to not make the hypothetical change, the transfer-switch controller 108 may not change the settings of the feature and remain in the safe state.

In an example, if the user selected to make the hypothetical change, the transfer-switch controller 108 may temporarily suspend the safe state so as to make the hypothetical change. Further, after making the change, the transfer-switch controller 108 may re-enter (e.g., automatically re-enter) the safe state. An example input command corresponding to whether the user selected to make the hypothetical change may also indicate whether the user would like to exit the safe state. As another example, an input command corresponding to whether the user selected to make the hypothetical change may also indicate whether the user would like to return to the safe state after the change is made.

In another example embodiment, any user input received during the safe state does not affect operational settings of the transfer switch. Therefore, in order to make any change to the operational settings, the user may first need to exit the safe state. For example, after receiving the provided information, the user may which to change one or more operational settings of the transfer switch. The user may then enter an input command indicating that the user wishes to exit the safe state. After exiting the safe state, the user may then elect to change operational settings. Beneficially, by not allowing any user input received during the safe state to affect operational settings of the transfer switch, the user can be confident that the user can explore and learn about various features without any risk of changing—inadvertently or otherwise—the operational settings of the transfer switch.

e. A Second Exemplary Method

Figure 4:
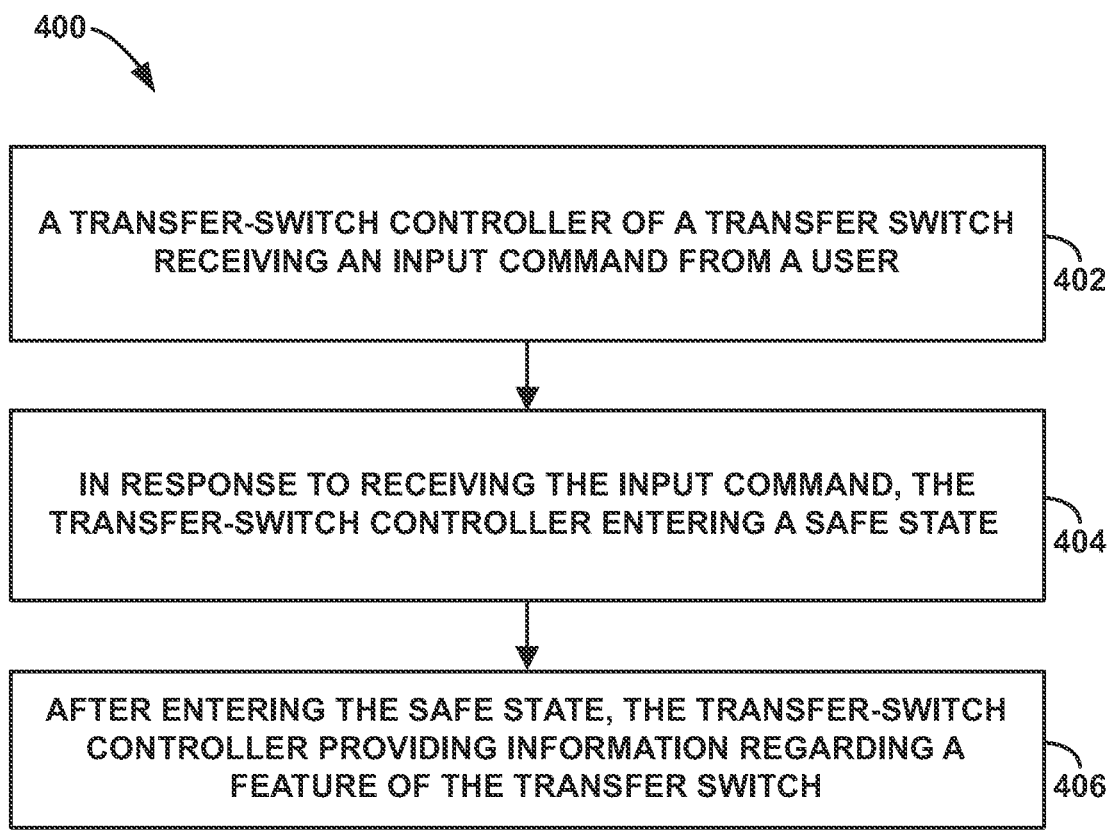
FIG. 4 is a flow chart illustrating an example method, according to an example embodiment of the present disclosure.

FIG. 4 is a flowchart of a second exemplary method, in accordance with an exemplary embodiment. Note that method 400 may be carried out by one or more components of the transfer-switch system 100, such as transfer-switch controller 108; furthermore, method 400 is related in some respects to method 300, and thus is not described in as great of detail. It should be explicitly noted, however, that any possibilities and permutations described above with respect to method 300 may equally apply to method 400.

As shown in FIG. 4, method 400 begins at step 402, when a transfer-switch controller of a transfer switch receives an input command from a user. At step 404, in response to receiving the input command, the transfer-switch controller enters a safe state, wherein in the safe-state operational settings of the transfer switch remain unchanged. At step 406, after entering the safe state, the transfer-switch controller provides information regarding a feature of the transfer switch. This provided information may, for example, be general information about the transfer switch, such as general information found in a manual for the transfer switch. In another example, provided information may be information specific to that transfer switch that is based on current operational settings of the transfer switch.

4. Example Benefits of the Disclosed Methods and Systems

As described above, the disclosed methods and systems may provide a user of a transfer switch with a focused and intuitive approach to learning and exploring the features of the transfer switch. This disclosed method and system may thus provide an improved way to learn and explore the features of the transfer switch that provides advantages over transfer-switch manuals and/or online videos or text. Further, the disclosed methods and systems may allow the user a convenient way to explore the features of the transfer switch in a safe environment. Since the transfer switch will enter a safe mode, the user can explore the features of the transfer switch without worrying about inadvertently changing the settings of the transfer switch. For example, if the user is unsure about a potential setting change, the user may enter the safe state and learn about the feature and/or the effects of changing the settings of the transfer switch.

The disclosed methods and systems may also increase the ability of the user to fully realize the potential of the transfer switch. For instance, the provided information may be specific to the operational settings of the transfer switch, and the user may learn currently unused features that would be available based on the current operational settings. Further, the disclosed methods and systems may ease the introduction of additional features and changes in the future. For instance, the methods and systems may help a user to fully understand the capabilities of the transfer switch and thus whether any additional features or changes are required.

5. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:

1. A power management device comprising:
   a memory configured to store program instructions; and
   a processor configured to execute the program instructions to:
      enter and then exit a safe state responsive to a user input, wherein in the safe state, operational settings of the power management device cannot be changed;
      receive an input command identifying a feature of the power management device about which a user is interested in receiving information; and
      after entering the safe state, provide responsive to the command, based on operational data of the power management device, information regarding the identified feature of the power management device.

2. The power management device according to claim 1, wherein the power management device comprises a transfer switch configured to switch between a primary power source and a backup power source.

3. The power management device according to claim 1, wherein receipt of the input command that identifies the feature of the power management device about which the user is interested in receiving information causes the power management device to enter the safe state.

4. The power management device according to claim 1, wherein the processor is further configured to execute the program instructions to:
   receive an input command to enter the safe state,
   wherein the input command to enter the safe state is different than the input command that identifies the feature of the power management device about which the user is interested in receiving information.

5. The power management device according to claim 1, wherein the processor is further configured to execute the program instructions to:
   prompt the user to select a feature of the power management device about which the user is interested in receiving information.

6. The power management device according to claim 1, wherein the operational data comprises a current operational setting of the power management device, and wherein the information provided regarding the identified feature of the power management device is specific to the current operational setting of the power management device.

7. The power management device according to claim 1, wherein the provided information comprises information regarding an interaction of the identified feature with at least one other feature of the power management device.

8. The power management device according to claim 1, wherein the provided information comprises information regarding at least one direct effect of the identified feature on the power management device.

9. The power management device according to claim 1, wherein the provided information comprises information regarding at least one side effect of the identified feature on the power management device.

10. The power management device according to claim 1, wherein the provided information comprises information regarding at least one situation in which the identified feature may be unavailable.

11. The power management device according to claim 1, wherein the provided information comprises at least one situation in which the identified feature may have different behavior based on other settings in the power management device.

12. The power management device according to claim 1, wherein any user input received during the safe state does not affect operational settings of the power management device.

13. The power management device according to claim 1, wherein the processor is further configured to execute the program instructions to:
provide an indication to the user that the power management device has entered the safe state.

14. The power management device according to claim 1, wherein the processor is further configured to execute the program instructions to:
receive an input command corresponding to a hypothetical selected action that a user may take with respect to the identified feature; and
provide information regarding an effect of the hypothetical selected action on the power management device.

15. The power management device according to claim 14, wherein providing information regarding an effect of the hypothetical selected action on the power management device, comprises at least one of:
providing information as to how the hypothetical selected action may affect the identified feature, or
providing information as to how the hypothetical selected action may affect one or more other features of the power management device.

16. The power management device according to claim 14, wherein the hypothetical selected action is a hypothetical change of a setting of the identified feature, and
wherein the processor is further configured to execute the program instructions to:
prompt the user to select whether to make the hypothetical change;
receive an input command corresponding to whether the user selected to make the hypothetical change; and
provide information showing the user how to make the hypothetical change after exiting the safe state.

17. The power management device according to claim 14, wherein the hypothetical selected action is a hypothetical change of a setting of the identified feature, and
wherein the processor is further configured to execute the program instructions to:
prompt the user to select whether to make the hypothetical change;
receive an input command corresponding to whether the user selected to make the hypothetical change; and
if the user selected to make the hypothetical change, leave the safe state and change the setting of the identified feature based on the hypothetical change, but if the user selected to not make the hypothetical change, not change the setting of the identified feature and remaining in the safe state.

18. The power management device according to claim 17, wherein the processor is further configured to execute the program instructions to:
upon changing the setting of the identified feature based on the hypothetical change, automatically re-enter the safe state.

19. A power management device comprising:
a memory configured to store program instructions; and
a processor configured to execute the program instructions to:
in response to receiving an input command, enter and then exit a safe state, wherein in the safe state operational settings of the power management device remain unchanged;
after entering the safe state, receive an input command corresponding to a hypothetical selected action related to a feature of the power management device; and
provide, based on current operational settings of the power management device, information regarding an effect of the hypothetical action on the power management device.

20. The power management device according to claim 19, wherein the processor is further configured to execute the program instructions to:
receive an input command corresponding to whether the user selected to take the hypothetical action; and
provide information showing the user how to take the hypothetical action after exiting the safe state.

21. The power management device according to claim 19, wherein the processor is further configured to execute the program instructions to:
receive an input command corresponding to whether a user selected to take the hypothetical action; and
if the user selected to take the hypothetical action, leave the safe state and automatically take the hypothetical action.

22. The power management device according to claim 19, wherein the effect of the hypothetical action on the power management device comprises at least one of:
an effect of the hypothetical action on the feature of the power management device; or
an effect of the hypothetical action on another feature of the power management device.

23. The power management device according to claim 19, wherein the hypothetical action related to the feature of the power management device is a hypothetical change of a setting of the feature.

* * * * *